United States Patent [19]
Cotner et al.

[11] Patent Number: 6,031,978
[45] Date of Patent: *Feb. 29, 2000

[54] SYSTEM, METHOD AND PROGRAM FOR ENABLING A CLIENT TO RECONNECT TO A SAME SERVER IN A NETWORK OF COMPUTER SYSTEMS AFTER THE SERVER HAS MOVED TO A DIFFERENT NETWORK ADDRESS

[75] Inventors: Curt Lee Cotner; James Willis Pickel, both of Gilroy, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/674,239

[22] Filed: Jun. 28, 1996

[51] Int. Cl.[7] ........................................... G06F 13/00
[52] U.S. Cl. .................. 395/200.78; 395/200.79; 395/200.31; 395/200.51; 395/200.58; 395/200.59; 395/200.69; 395/182.02; 395/182.05
[58] Field of Search .................. 395/200.78, 200.79, 395/200.31–200.33, 200.43, 200.51, 608, 610, 615, 653, 182.02, 182.01, 182.04, 182.05, 182.08, 182.09, 182.13–182.18, 200.58, 200.59, 200.69; 364/134, 184, 282.1, 282.4, 285, 284.4, 228.1, 246.12, 242.94, 253.3, 255, 731.46, 945.6, DIG. 1; 371/5.4, 42, 47.1

[56] References Cited

U.S. PATENT DOCUMENTS

| | | |
|---|---|---|
| 4,644,468 | 2/1987 | Doster et al. . |
| 4,648,031 | 3/1987 | Jenner . |
| 4,718,005 | 1/1988 | Feigenbaum et al. . |
| 4,819,159 | 4/1989 | Shipley et al. . |
| 5,027,269 | 6/1991 | Grant et al. .............................. 395/680 |
| 5,109,483 | 4/1992 | Baratz et al. ...................... 395/200.57 |
| 5,142,622 | 8/1992 | Owens ................................ 395/200.57 |
| 5,224,098 | 6/1993 | Bird et al. ................................ 395/500 |
| 5,327,532 | 7/1994 | Ainsworth et al. . |
| 5,329,626 | 7/1994 | Klein et al. ......................... 395/200.78 |
| 5,335,343 | 8/1994 | Lampson et al. ................... 395/182.17 |
| 5,371,886 | 12/1994 | Britton et al. . |
| 5,410,684 | 4/1995 | Ainsworth et al. ................. 395/182.16 |
| 5,495,582 | 2/1996 | Chen et al. ......................... 395/200.57 |
| 5,537,417 | 7/1996 | Sharma et al. ....................... 395/200.58 |
| 5,546,582 | 8/1996 | Brockmeyer et al. ................... 395/680 |
| 5,561,797 | 10/1996 | Gilles et al. ............................ 395/608 |

OTHER PUBLICATIONS

"Systems Network Architecture", LU 6.2 Reference: Peer Protocols, Document No. SC31–6808–1, Jun. 15, 1990, Chapter 8.

Two–Phase Commit Optimizations in a Commercial Distributed Environment, Samaras, G.; Britton, K.; Citron, A.; Mohan, C.; Distributed Parallel Databases, 3325–360, 1995.

"Resource Identification Scheme", Duffie III, C.A.P.; Wheeler, W.R., IBM Technical Disclosure Bulletin, vol. 13, No. 11, Apr. 1971, pp. 3426–3427.

U.S. Application Serial No. 08/682,830, Hunter et al, filed Jul. 12, 1996.

*Primary Examiner*—James P. Trammell
*Assistant Examiner*—Tuan Q. Dam
*Attorney, Agent, or Firm*—Gates & Cooper

[57] ABSTRACT

The system, method and program of this invention provides a technique that enables a client, connected by a network, such as TCP/IP, to a multi-server system, such as a parallel database management system, to locate a server product that may have moved to a different network address within the multi-server system. More specifically, the client is able to perform two-phase commit and automatic resynchronization with a same DBMS server that may have moved to a new network address before a transaction with the client was committed. In order to complete the two-phase resynchronization process for uncompleted units of work, the client system has to reestablish connection to the previously connected DBMS member.

12 Claims, 5 Drawing Sheets

SYSTEM, METHOD AND PROGRAM FOR ENABLING A CLIENT TO RECONNECT TO A SAME SERVER IN A NETWORK OF COMPUTER SYSTEMS AFTER THE SERVER HAS MOVED TO A DIFFERENT NETWORK ADDRESS

BACKGROUND OF THE INVENTION

1. Field of the Invention

This invention relates to enabling a client system that is networked into a sysplex environment via a network such as TCP/IP to locate a specific server within the sysplex environment, and more specifically, for enabling a client system to complete a two-phase commit process with a same database management system (DBMS) that moved to a different network address before a client transaction was completed.

2. Description of the Related Art

The term "sysplex" is used generally herein to describe a group of computer systems which has parallel processing capability. More specifically the term "sysplex" is used herein to describe a group of computer systems that make up a parallel database management system (DBMS). Most database management systems (DBMS) on the market today use some form of parallelism to address high-volume transaction workloads.

Figure 1:
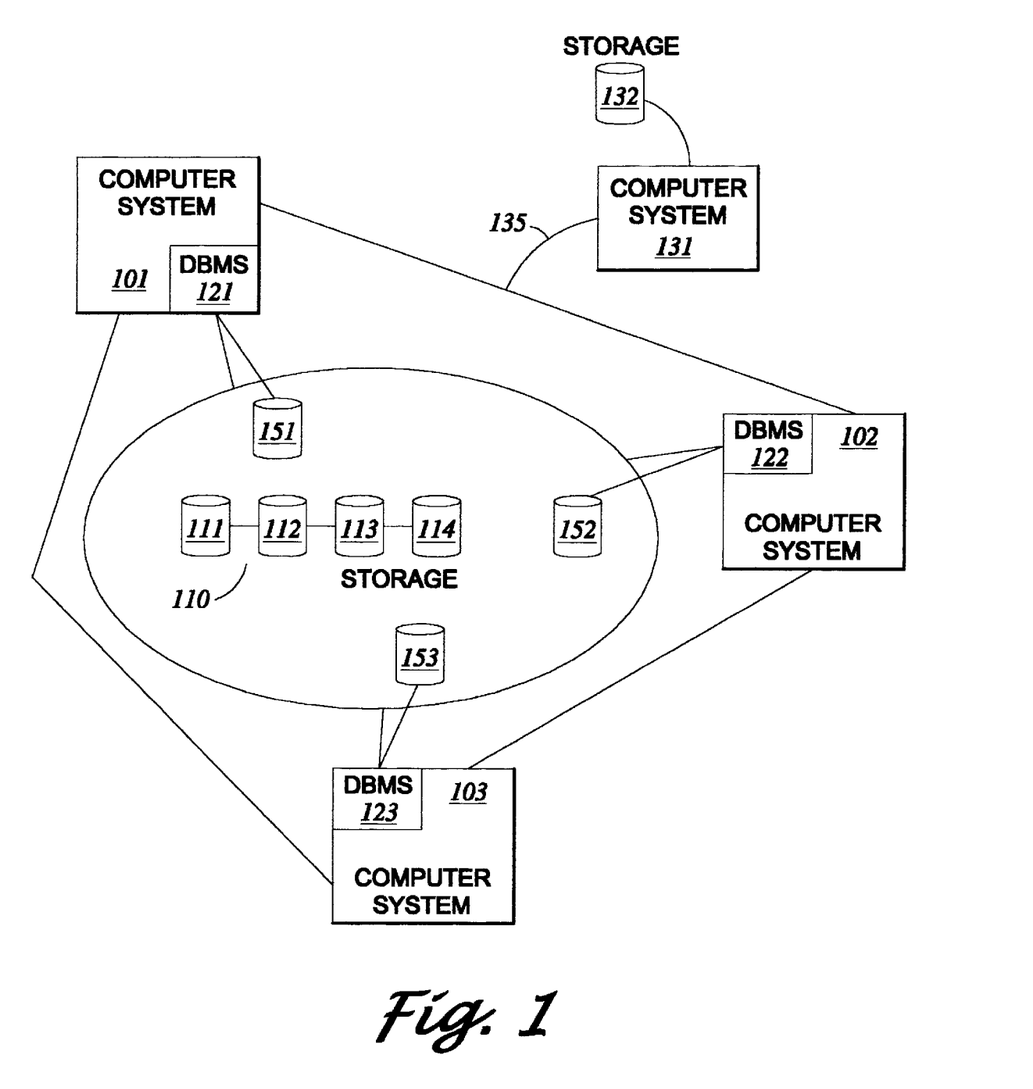
FIG. 1 illustrates a sysplex environment known in the art.

FIG. 1 illustrates a sysplex environment 100 of three computers 101, 102, 103 sharing disk space such as a pool 110 of disk drives 111–114 where the database resides. FIG. 1 is illustrative of systems having a "shared-disk" architecture, i.e., where multiple computer systems in the sysplex share a common pool of disk devices. Other systems have a "sharenothing" architecture, where each of the computers in the sysplex own a subset of the data managed by the parallel DBMS sysplex. In either architecture, each system 101, 102, 103 has its own physical copy of a database management system product 121, 122, 123. Also, in both architectures, each system 101, 102, 103 has a separate log dataset 151, 152, 153, respectively, for managing the commit or roll back of a unit of work. This separate log dataset can only be accessed by the DBMS that owns it. All of the DBMSs 121–123 know how to communicate back and forth to each other, and they know how to manage the pool of data 110 that is common to them. An example of a sysplex environment is an IBM parallel scalable sysplex such as the sysplex capable CMOS 390 systems which have a sysplex timer, a coupling facility, and fiber optic communication links.

A client 131 is connected via a network 135 to the sysplex 100. The client could be another parallel sysplex or a workstation (such as one running an OS/2 or UNIX operating system) or other personal computer. The client 131 views the sysplex 100 as one image.

The client 131 communicates with one member, i.e., a DBMS server, of the sysplex to do work. The client has a log dataset 132, but may not have a database. During a two-phase commit process, as the client does work, the client records information in the log dataset. The DBMS server 121 that the client is communicating with in performing the work also has a dataset 151 to record the DBMS server's information. The DBMS writes log records to a log dataset describing changes to the status of the client's unit of work. Such information may include the statements that were performed in the unit of work, undo and redo records for the rows that were changed, the outcome of the work, i.e., committed or rolled back, etc. Only one member of the DBMS sysplex has read/write access to the log dataset containing the records for the client's unit of work.

Problems arise when client systems establish a connection to a server sysplex, such as a DBMS server sysplex, using TCP/IP, especially when a two-phase commit procedure is required. For a network 135 such as TCP/IP, the network routing is accomplished with two values, the IP address and the TCP/IP port number, i.e., the socket address. The IP address identifies the hardware network adapter that is used to connect the DBMS server to the network. This may be a channel address or a 3172 control unit that a token ring is plugged into. When a DBMS product moves from one system to another, or from one control unit to another within the same system, its IP address changes. This invalidates the network routing information that the client had previously used.

The port number identifies a server product, such as a DBMS. TCP/IP routes messages to each DBMS server using the TCP/IP port number, i.e., socket number, of the DBMS server. Generally, TCP/IP servers are configured so that all instances of a given server have the same TCP/IP port number. This port number is usually called a "well-known" port. For example "446" is a well-known port. All RDBMSs that adhere to the Distributed Relational Database Architecture (DRDA) will always try to use this port. It is a predefined port for SQL databases. (Other file transfer programs and TCP/IP standard applications have their own predefined ports.) If multiple members of the DBMS sysplex are restarted on a single computer system, only one member can own the well-known port at any point in time. Clients are not able to connect to the other DBMS sysplex members on that computer system using the well-known port.

In order for a parallel sysplex to operate seamlessly as a single system image to the clients, every DBMS server must have the same port number. This assumes that all of the DBMS which answer to a same port number are equivalent in terms of function. A problem arises because the DBMS servers are not equivalent, and are not interchangeable with each other, when communicating with a client during a two phase commit procedure (unless the systems have peer recovery capability which is discussed below). If contact is lost during a communication session, the client must talk to the same DBMS server that the client had just lost contact with because it is that DBMS server that owns the log dataset that has the record of information as to the status of the in-progress unit of work.

When a communication failure occurs during the two-phase commit process, the client must "resynchronize" with the member of the sysplex that owns the log records associated with the client's unit of work. The resynchronization process allows the client to determine the outcome (success or failure) of the unit of work at the DBMS server. In order to perform resynchronization, the client must re-establish communications with the member of the DBMS sysplex that performed the original unit of work. It may be difficult for the client to connect to the correct member of the sysplex for several reasons. First, the required member of the DBMS sysplex may not be active when the client attempts resynchronization. Second, the required member of the DBMS sysplex might have moved from one computer system to another. This is often done to help balance computer resources, or it can occur when the sysplex recovers from a failure of one of the computers in the sysplex.

Previously, servers (such as a DBMS) could not move to another system. If the server went down, the client just waited for the server to come back up. Now, servers are able to move to another system. This movement is necessary if a machine that a server is running on crashes and another machine is capable of handling the workload of the machine that crashed. Allowing a DBMS to move to another machine enhances workload balancing and data availability. However, when a DBMS member moves to restart on another machine, the IP address of the DBMS member will change. Also, a given machine may have a number of control units connected to it to provide network access to the machine, and each control unit has a different IP address. If a control unit crashes, the DBMS server may be able to be addressed through another control unit having a different IP address on the same machine. Therefore, if a different controller within the same machine is used, the IP address of the DBMS member will change, also. Presently, the client would have no knowledge of the new IP address, and therefore could not continue to communicate with the same DBMS that had moved. The movement of a member of the DBMS sysplex to a different computer, or through a different control unit, and the changing of the RDBMS member's TCP/IP network address prevents clients from performing resynchronization, since the clients would ordinarily use the member's TCP/IP address to establish network connectivity.

One alternative approach is to support peer recovery for DBMSs in the sysplex environment. A DBMS would route the resynchronization request to the DBMS member which performs the peer recovery for the failed member. However, peer recovery is difficult to implement. There are timing problems that can occur when multiple DBMSs try to access the failed DBMS's log data. A substantial amount of program code is needed to serialize access to that log data. The serialization could become a performance bottleneck.

The above described problem is unique to networks such as TCP/IP, NETBIOS and other networks (herein defined as non-solution networks) that do not provide their own network solution.

A network such as SNA provides its own network solution to the above stated problem. For example, VTAM LU 6.2 is communication software that allows systems, such as in a sysplex environment, to communicate between each other. The network management product VTAM LU 6.2 runs in a layer above the DBMS product. With the SNA network protocol managed by VTAM, each DBMS member is uniquely identified via a LU name. The same LU name is used even if a DBMS fails and restarts on a different computer system. When the DBMS moves, the network name moves with it. As such, the network address of the DBMS does not change. Because the LU name is associated with the DBMS and the LU name moves with the DBMS when the DBMS moves from one system to another, it is possible for the client system to use the DBMS LU name for network routing, regardless of which system houses the DBMS.

However, not all networks are SNA networks. Therefore, an approach is needed for those networks such as TCP/IP and NETBIOS that do not provide a network solution for the above problem. However, any such approach should be less difficult to implement than peer recovery, and should be one which does not suffer from performance bottleneck problems. Also, it is desirable that such an approach preserve the ability for a client to access the sysplex seamlessly while still being able to resolve the indoubt unit of work with a same DBMS that may have moved to another IP address.

SUMMARY OF THE INVENTION

It is an object of this invention to allow a DBMS to move throughout the sysplex to enhance workload balancing and data availability while preserving the ability for a client to access the sysplex seamlessly and to resolve the indoubt unit of work with a same DBMS.

It is a further object of this invention to preserve the external interface that results in the IP address and port being transparent as to which DBMS is being communicated with in providing a single system image of the sysplex to the client, while still enabling a client to communicate with a specific DBMS.

The system, method and program of this invention provides a technique that enables a client connected by a network, such as TCP/IP, to perform two-phase commit and automatic resynchronization with a DBMS server that is a member of a parallel sysplex such as one having a "shared-disk" architecture or any other loosely coupled sysplex environment. The invention allows the two-phase commit protocol to work properly, even when the DBMS server's TCP/IP network attributes are impacted. For example, the DBMS member's TCP/IP network address may change between the original SQL unit of work and the resynchronization process for that unit of work because of the DBMS server member restarting on a different computer. Additionally, the DBMS member's well-known TCP/IP port may be unavailable because it is in use by another member of the DBMS sysplex. Since the network TCP/IP address is associated with the server computer system, the DBMS member cannot be uniquely identified via the TCP/IP address.

For a DBMS sysplex that does not support peer recovery for a failed DBMS member, the two-phase resynchronization process can only be done by the same DBMS member in which the unit of work was originally established. In order to complete the two-phase resynchronization process for uncompleted unit of works, the client system has to reestablish connection to the previously connected DBMS member.

With this invention, the client system is enabled to locate the previously connected server DBMS member in a sysplex to perform the two-phase resynchronization process. Each DBMS member in the sysplex is associated with an unique member identifier called the resynchronization port number. This unique DBMS member ID stays the same once the DBMS member joins the sysplex. For a client system using the two-phase protocol to communicate with a server DBMS member, the server DBMS member ID is saved in the client system's logs.

Each active DBMS member registers its current TCP/IP address and resynchronization port number in a shared area which is accessible by any member in the sysplex. When a two-phase resynchronization process is requested by a client system and the unit of work is not known to the current connected DBMS member, the resynchronization process is rejected. The client system can send a message to any active DBMS member to request a copy of a global list of active resynchronization port numbers and TCP/IP addresses. Alternatively, the server can send to the client the corresponding IP address of the desired resync port number from the list. From the information returned, the client system can connect to the right DBMS member to perform the resynchronization process.

The system, method and program of this invention has the following attributes. Each server member is assigned a well-known port and unique resync port number at a time the server member is started up. The server's physical IP address and resync port number are stored in a list in a global area accessible by all of the other server members. When a client establishes a connection to a server member, the client will receive the server member's resync port number as part of the initial handshaking between the client and the server. In one embodiment, the global list can also be received as part of the initial handshaking. The client records the server's unique resync port number in the client's dataset. If the client experiences a communication failure with that server, the client will attempt to reconnect via the last known IP address. If this fails, the client will send a message to the Domain Name Server requesting an IP address of any active server in the network. Upon receipt of an address, the client will send a connect message to that address. Upon receipt of the connection request message, that server will scan the global list to find the matching server via the matching resync port number and will send the corresponding IP address of the matching server to the client. Alternatively, upon receipt of the connection request message, the server can send a copy of the global list as part of the initial handshaking. When the client receives the global list, the client will scan the list for a resync port number that matches the resync port number in the client's dataset. The client performs a resynchronization process via the IP address associated with that resync number. If there is no match of resync port numbers, the client waits and retries the above steps by recontacting the Domain Name Server for an active server.

The present invention is less difficult to implement than peer recovery, and it does not have the performance bottleneck problems associated with peer recovery. This invention gives a user greater flexibility and improved data availability in the database and the data records. Data availability is improved because while data is in doubt, the rows of the table are locked up and not available to other members of the system. The faster indoubt data is resolved, as with this invention, the greater data availability is increased.

The system, method, and program of this invention for performing two-phase commit have the following advantages. First, a client can route new SQL work to any available member of the DBMS sysplex, even when the client has outstanding units of work with specific members of the DBMS sysplex that have not been resolved. Second, the server's TCP/IP network address can change between the SQL activity and the resynchronization process, without impacting the resynchronization process. Third, each member of the DBMS sysplex can process resynchronization requests, even when multiple members of the DBMS sysplex are restarted on the same computer with the same TCP/IP image. Fourth, the client can still use the normal TCP/IP conventions for invoking the server: i) use the TCP/IP Domain Name Sever (DNS) to find the server's TCP/IP address, and ii) use a well-known TCP/IP port number to invoke the server.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Figure 2:
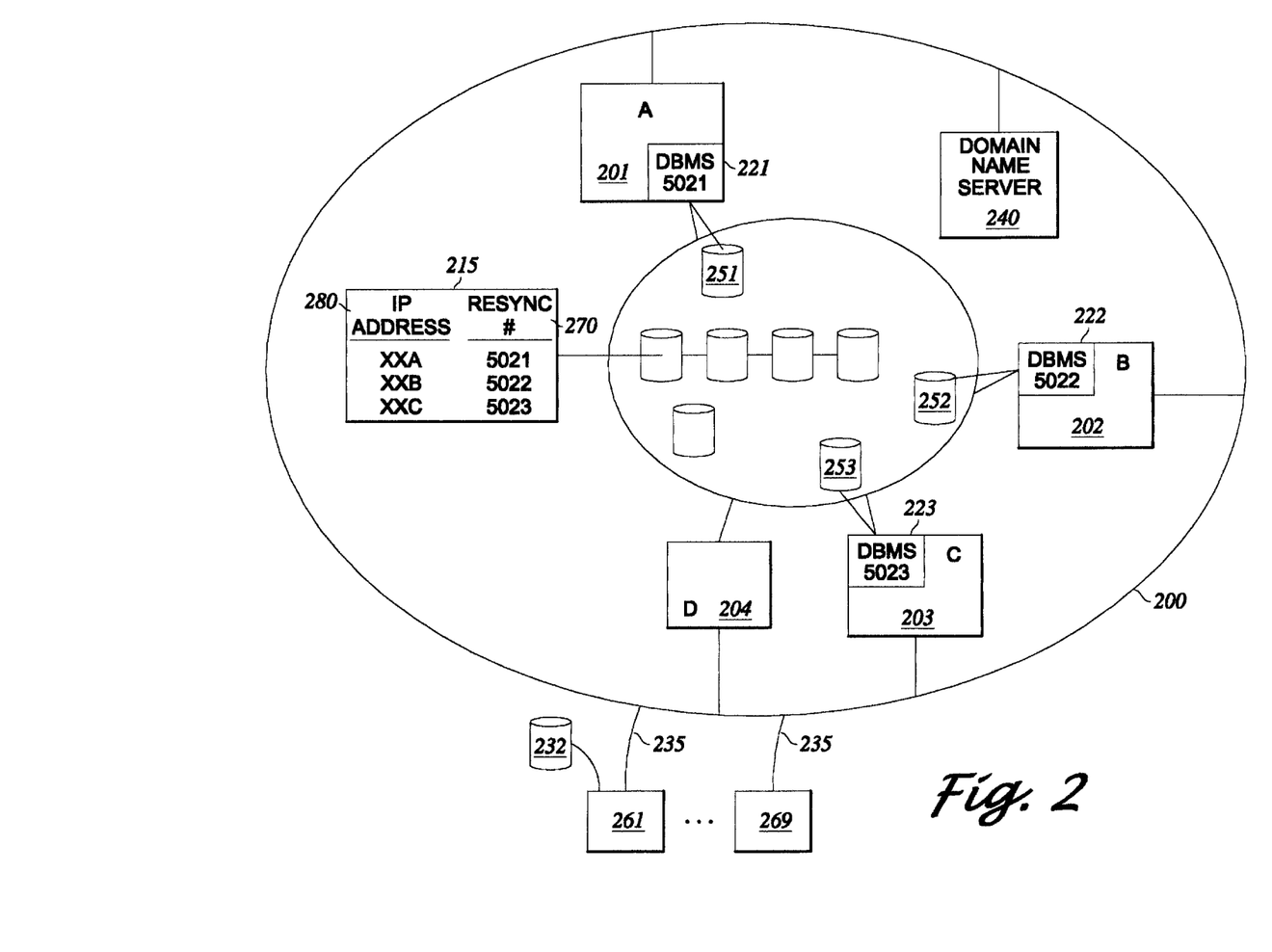
FIG. 2 illustrates a sysplex environment in which the system, method, and program of this invention is utilized.

FIG. 2 illustrates a sysplex environment having a "shared-disk" architecture in which the system, method, and program of this invention is utilized. Although this invention is applicable to any type of server, e.g., file servers, print servers, file transfer programs (FTP), etc., the following preferred embodiment will be described with reference to a DBMS server such as a relational database management system product such as IBM DB2. However, the invention also could be applicable to other non-relational database management system products such as object oriented database management system products, etc.

As shown in FIG. 2, the DBMS sysplex 200 consists of three computers 201, 202, 203, each of which runs a copy of the DBMS product 221, 222, 223, respectively, and a fourth computer 204 which, for illustration purposes, is not running a DBMS product at the given time. At any given point in time, large numbers of clients 261–269 will be communicating over a network 235 such as TCP/IP with the members of the sysplex. The clients will be performing a two-phase commit procedure. If one of the three computer systems encounters a hardware failure, the DBMS on the failed computer can be restarted on any of the other surviving systems. Each operating system on each of the machines contains an automatic restart manager facility (ARM) that will automatically restart all of the components on the machine that are down to another machine when an outage occurs. It should be noted that two copies or more of a DBMS can be restarted on the same machine. After restart, the clients can perform resynchronization with the failed DBMS member. This allows clients to complete processing of indoubt units of work and release the associated DBMS locks for greater data availability.

Figure 3:
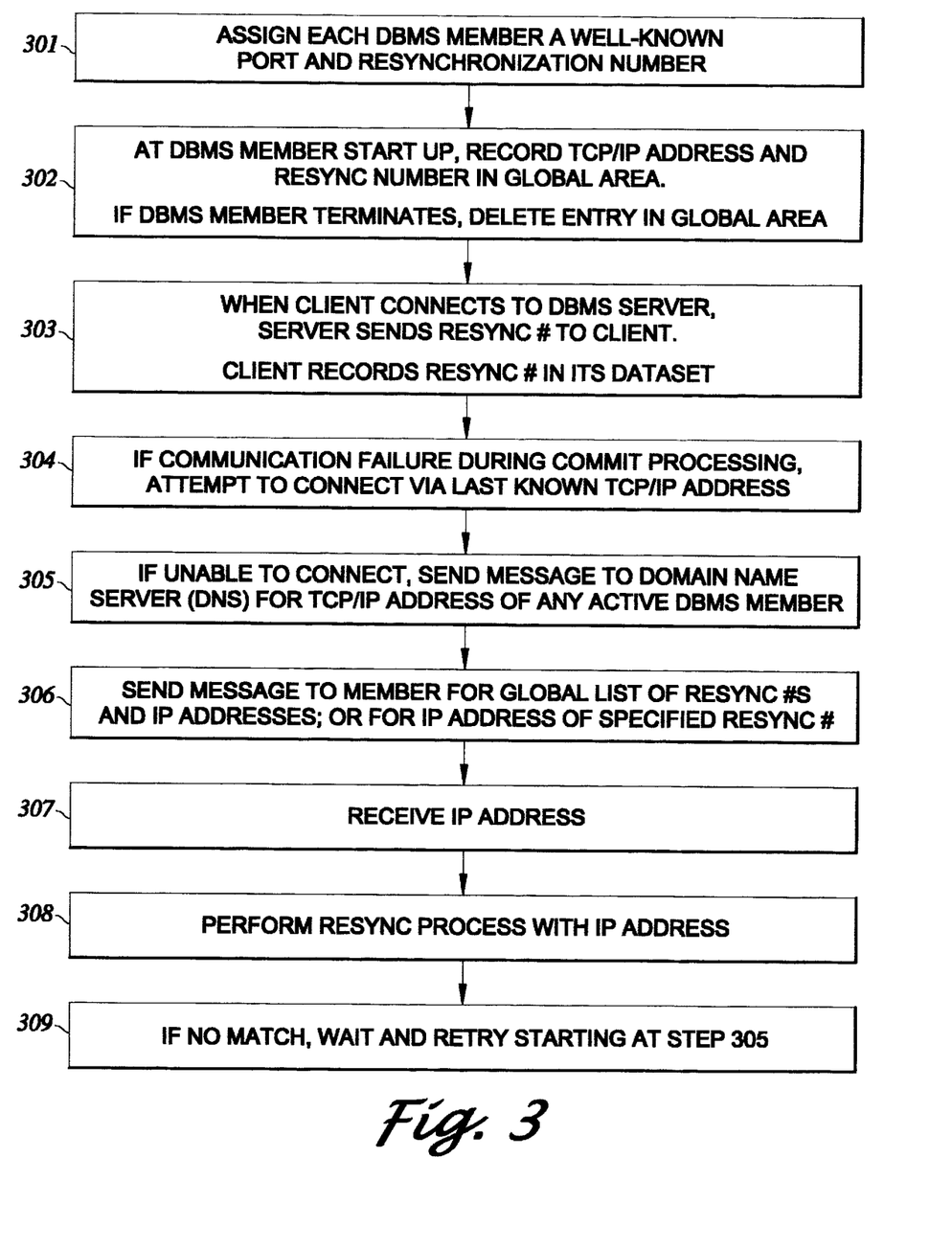
FIG. 3 illustrates the overall method steps of the invention.

With reference to FIGS. 2 and 3, the system, method, and program used to provide two-phase commit for a shared-disk DBMS sysplex with TCP/IP is described as follows.

Each member of the DBMS sysplex is assigned two TCP/IP port numbers: 1) a well-known port for processing new SQL units of work, and 2) a port for processing resynchronization requests, step 301. The well-known port number is also referred to as an SQL port number such as "446" that is specified by a client. The port number of the well-known port is the same for all members of the sysplex. Only one member can use this port number when multiple members run on a single computer system with one TCP/IP image. In contrast, the port number of the port for processing resynchronization requests is uniquely assigned to each DBMS member, so that no two members of the sysplex have the same resynchronization port number.

With reference to FIG. 2, the DBMS members 221, 222, and 223 are assigned resynchronization port numbers 5021, 5022, and 5023, respectively. Consequently, each DBMS server has two port numbers—a unique resynchronization number but the same SQL port number, e.g. 446. When a client wants to connect to port 446, i.e., a DBMS server, any one of the servers are all equally capable of being the one to which the client is connected. However, if a client needs to resolve an indoubt unit of work and needs to look at the server's log dataset, the client uses the resync port number that is unique to a specific DBMS.

As shown at step 302, FIG. 3, when each member 221, 222, 223 of the DBMS sysplex starts up, a registration process takes place. At start up, a DBMS server member records its current TCP/IP address 280, i.e., the address of the hardware network adapter to which the DBMS is connected, and resynchronization port number 270 in a global area 215 that can be accessed by all members of the sysplex. The global area could be a shared dataset, or a memory area that all members of the sysplex can interrogate. The shared memory or coupling facility may be in RAM or external storage or other memory device, although external storage may provide poorer performance overhead.

When a RDBMS member terminates normally or abnormally, the row in the global area for that member is deleted, indicating that the member is not currently active. The servers are polled periodically to ensure that they are active. The polling could be done by the DBMS's, an operating system function, the network, or any other such technique. When the polling indicates that they are no longer active, the entry in the global list for that server is deleted.

When a client 261 connects to a server in the DBMS sysplex 200 using TCP/IP, the DBMS sysplex server sends its unique resynchronization port number to the client. The client records this information in its own log dataset 232, so that failures during commit processing can be routed to this TCP/IP port for resynchronization processing, step 303. If the unit of work is committed, the client discards the resync port number from the client's dataset. But if something happens before the commit is finalized, the resync port number is used to find the server that owns the log data.

In a preferred embodiment, if a communication failure occurs during commit processing, the client attempts to connect via TCP/IP to the server's last known TCP/IP address using the server's resynchronization port number, step 304. In alternative embodiments, this step can be omitted. In the preferred embodiment, this attempt will fail if the server is still down, or the server has restarted on another computer.

For example, if client 261 is communicating with DBMS 221 which has resync port number 5021 and an IP address of "XXA", and the communication session failed, but DBMS 5021 is still at IP address "XXA", then client 261 can go back to machine A 201 at IP address "XXA" and get the same DBMS server 5021 when the communication session is reestablished.

Figure 5:
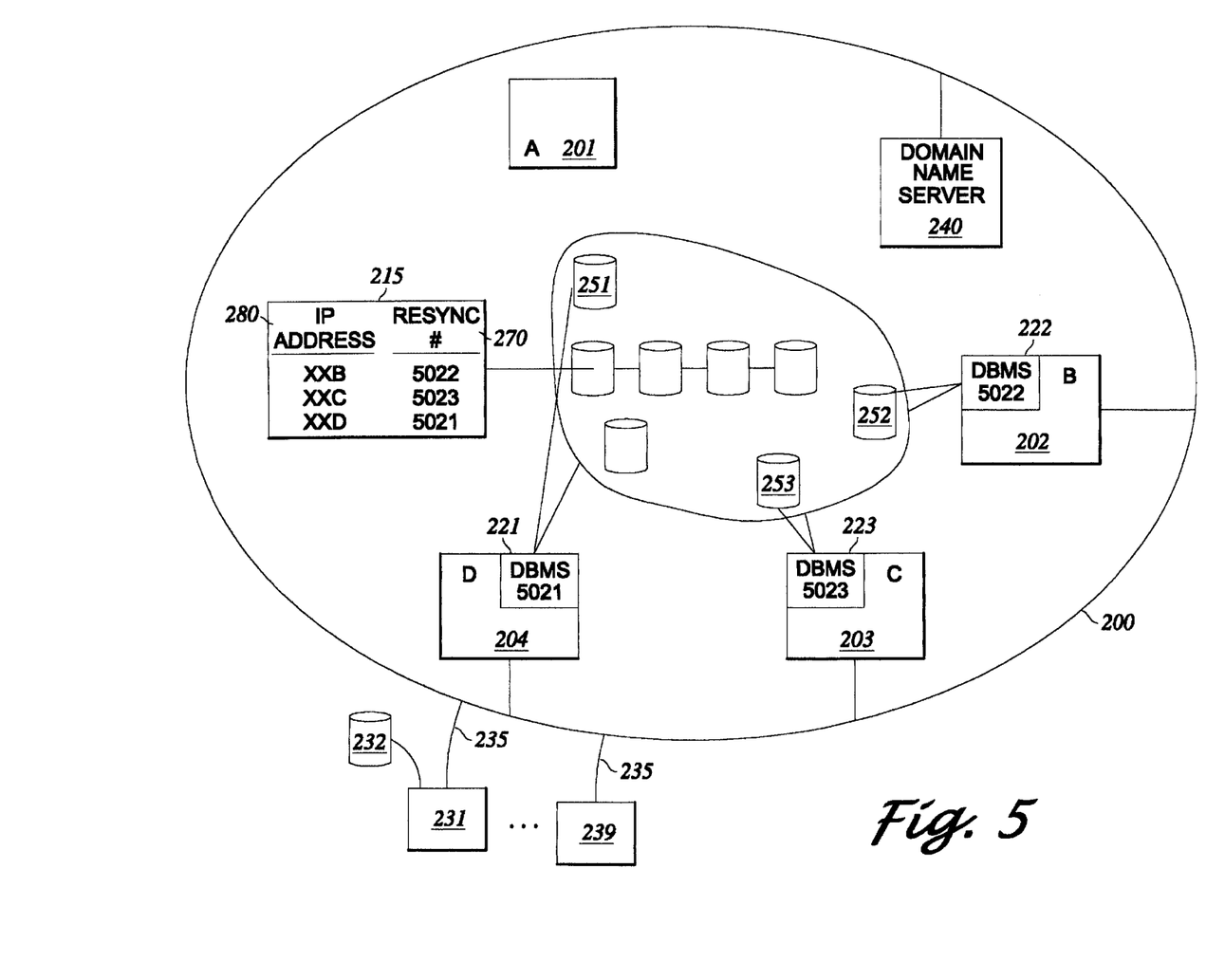
FIG. 5 illustrates the embodiment of the invention after a server member has moved to another address within the sysplex environment.

However, now with reference to FIG. 5, if machine A 201 crashes and is no longer available, and the DBMS server 221 has moved to machine D 204, then a message from the client 261 to machine A 201 will get no response since the DBMS server 221 is not there. Although the log dataset 251 that was used by the DBMS server 221 on machine A 201 for the client's 261 transaction is physically accessible to all of the systems in the sysplex, only machine D 204, where the DBMS 221 has now moved, is now allowed to read it should the client 261 establish communication with the DBMS server 221 on machine D 204.

The following describes how a client 261 locates the same DBMS server 221 if the DBMS server moves to a different IP location. If the client is unable to connect to the required server member, as in the example above, then the client can send a message to the TCP/IP Domain Name server 240 asking for the TCP/IP address of any active member, such as a DBMS server member which has a well-known port of 446, of the server sysplex, step 305. Typically, the Domain Name Server is a separate machine 240 within the network. The Domain Name server keeps a directory of all of the different groups of machines on the network. Each group of machines is given a long name such as "system1.vnet.ibm.com." The client registers that its databases are part of the system called "system1.vnet.ibm.com." This keeps users from having to hard code the internet address. The domain name server keeps track of the places that one can go to get to the name. The TCP/IP Domain Name Server (DNS) 240 will send a message back containing one of the IP address that are active for that named group, e.g. for machine B 202, machine C 203, or machine D 204.

After getting the address of a sysplex member, e.g. DBMS 223 on machine C 203, the client can send a message to that member requesting a copy of the global list 215 of active TCP/IP addresses 280 and resynchronization port numbers 270, or requesting the corresponding TCP/IP address of the specified resynchronization port number, step 306. In one embodiment of the invention, once the client gets to a machine in the system, the first handshaking automatically gives the client the global list. This would be true even during the first handshaking between a client and a server when the client uses the SQL port number, i.e., the well-known port 446, see step 303 above, to initially establish a communication session with any DBMS server. The server will send to the client a copy of this global list, i.e., a table that has the list of all of the resync numbers and corresponding IP addresses that are actively part of the sysplex.

In the one embodiment, the client scans the list, looking for the row containing the resynchronization port number, e.g. 5021, of the failed server, step 307. In a preferred embodiment, the server would scan the global list for the correct entry. If a correct entry is found, the server sends the IP address of the correct entry, i.e., matching resync port number, to the client.

If a matching row is found in the list, either by the client or the server, depending upon the embodiment utilized, the client breaks the connection to machine C 203 and restarts a connection to perform resynchronization with the TCP/IP address listed in that row, e.g. "XXD" for machine D 204, step 308. Resynchronization should be successful because the entry is only in the list when the DBMS member is active.

If no matching row is found in the list, the failed member has,not yet restarted. The client waits for a few minutes, and retries the request, step 309, beginning with step 305 above.

The technique of this invention utilizes a "retry" approach for the client, i.e., the client retries a request to the Domain Name Server for any active member, and then the client sends a communication to one of the active members in order to get a copy of the global list on the first handshake of that communication session. Because the servers register their IP address and resync port number when they start within a sysplex, the global list has the possibility of being more current at any given time than the list maintained by the Domain Name Server. The Domain Name Server list may lag in currency by days. In comparison, a minute may be too long for a client to wait to perform resynchronization in some high speed/high usage transaction systems. For example, in some IBM machine architectures there can be up to 32 machines coupled together. If there are more than one control units per machine, there can potentially be 32*n entries in the Domain Name Server for a named group of machines. If a client were to merely go serially down the Domain Server List and try to establish a communication session with each one to determine if it was the "right" DBMS server, this process would take a long time. The process could possibly take days to find the "right" DBMS server, especially since it may take that long for the Domain Name Server to be correctly updated.

Some of the following system components are specifically noted. "Means for receiving, at a server from a client, an indoubt unit of work" is through well-known query and transaction commands. "Means for changing a network address" or "location" include an automatic restart manager facility (ARM) that is part of the operating system, or by a user reloading the server product on another machine, etc. "Means for completing a resynchronization process" or "request" include well-known techniques for completing the two-phase commit protocol when an error is encountered during the commit process. "Means for receiving" or "sending" of data can be through network messages, shared memory, or shared disk techniques. The "data" may be added to a well-known message having its own message field or data structure or incorporated into existing fields or data structures. "Means for storing" and "recording" include well-known techniques for storing or recording data to memory such as RAM or external storage. Any and/or all of the above means may include software, hardware and/or firmware or any combination or subcombination of the above.

Figure 4:
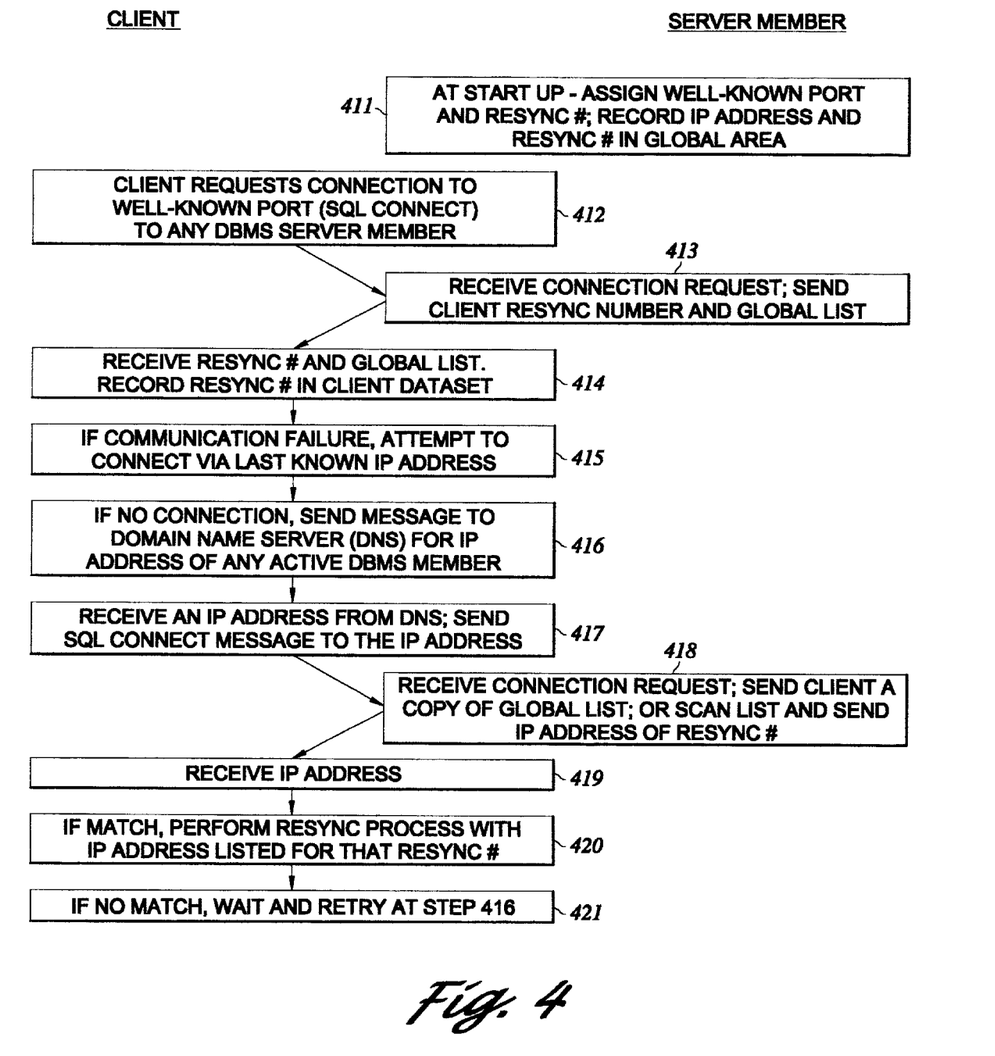
FIG. 4 illustrates the program code structure for the part of the invention that resides at the client and for the part of the invention that resides at each server member.

Part of the invention, as described herein, is implemented at the client and part of it is implemented at each server member. In a preferred embodiment, the invention is implemented through program code at the client and in a DBMS server product. FIG. 4 illustrates the steps at a client and server member for which the program code would enable or cause various well-known hardware and software components in a sysplex environment to carry out. Essentially, to carry out the technique of this invention, a DBMS server product would have program code added that would direct the server product to record its IP address and unique resync port number in a global area that can be shared among all of the systems in the sysplex, step 411; and upon a connection request from a client, to send to the client the server member's resync port number. In one embodiment, a copy of the global list would also be sent, steps 413 and 418. Program code would be added to the client software that would enable the client to expect to receive the server member's resync port number and a copy of the global list, and to save the resync port number in the client's dataset for that transaction, step 414. Program code would also instruct the client to discard the resync port number upon successful completion of a transaction with that DBMS server. Program code at the client would also direct the client to carry out steps 415–417 and steps 419–421 which have been discussed above with reference to FIG. 3, steps 304–309, respectively.

Using the foregoing specification, the invention may be implemented using standard programming and/or engineering techniques using computer programming software, firmware, hardware or any combination or subcombination thereof. Any such resulting program(s), having computer readable program code means, may be embodied within one or more computer usable media such as fixed (hard) drives, disk, diskettes, optical disks, magnetic tape, semiconductor memories such as ROM, Proms, etc., or any memory or transmitting device, thereby making a computer program product, i.e., an article of manufacture, according to the invention. The article of manufacture containing the computer programming code may be made and/or used by executing the code directly or indirectly from one medium, by copying the code from one medium to another medium, or by transmitting the code over a network.

An apparatus for making, using, or selling the invention may be one or more processing systems including, but not limited to, cpu, memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention. While the preferred embodiment of the present invention has been illustrated in detail, it should be apparent that modifications and adaptations to that embodiment may occur to one skilled in the art without departing from the spirit or scope of the present invention as set forth in the following claims.

For example, although the invention has been described with reference to a sysplex environment, the invention could be applicable to other systems having multiple servers such as those within a single system, e.g., one having multiple processors with shared memory, or a network of systems. A network of systems may include a whole range of distributed systems from tightly coupled to closely coupled to loosely coupled, etc. Also, although this invention is described with reference to a DBMS server such as a relational database management system product such as IBM DB2, the invention is applicable to any type of server, e.g., file servers, print servers, file transfer programs (FTP), etc.

Also, the global list may be shared among the servers either through shared disk, shared memory, or via a message passing model or data structure passing model. The global list may be a table, such as a relational database table, a list, a data structure, or incorporated within a message format, or any equivalents hereto.

Although the invention specifically described the TCP/IP network, other networks are applicable such as NETBIOS and other networks that do not provide a network solution to the above addressed problem. Likewise, for consistency, the above described invention could be implemented even in these other "network solution" networks in order to provide a common approach regardless of the network protocol being used.

We claim:

1. A method for committing or rolling back a unit of work in a network of computer systems having a plurality of database management system DBMS) members, the method comprising:
    assigning a network address and resync identifier to each DBMS member, wherein the network addresses and resync identifiers are stored in a global list;
    establishing a connection between a client and a specified DBMS member, wherein the client receives the resync identifier of the specified DBMS member;
    receiving, from the client, an indoubt unit of work at the specified DBMS member;
    changing network address of the specified DBMS member after the indoubt unit of work is received; and
    completing a resynchronization process which commits or rolls back the indoubt unit of work using the resync identifier of the specified DBMS member to retrieve the changed network address in the global list for the client, so that the client can reconnect the specified DBMS member at the changed network address.

2. The method of claim 1 wherein the resync identifier is a unique resynchronization port identifier assigned to the specified DBMS member to complete the resynchronization process with the specified DBMS member.

3. A method for processing a plurality of resynchronization requests in a network of computer systems, the method comprising:

assigning a network address and resync identifier to each DBMS member, wherein the network addresses and resync identifier are stored in a global list;

establishing a connection between at least one client and the DBMS members, wherein the client receives the resync identifier of each DBMS member;

receiving, from the client, a separate indoubt unit of work at each of the DBMS members having separate network addresses;

changing at least one location of the plurality of DBMS members such that each DBMS member has a same resync identifier and a changed network address; and completing the plurality of resynchronization requests using the resync identifiers of the DBMS members to retrieve the changed network addresses in the global list for the clients, so that the client can reconnect to the DBMS members at the changed network addresses.

4. The method of claim 3 wherein the resync identifiers comprise separate unique resync port identifiers assigned separately to each one of the plurality of DBMS members to complete the plurality of resynchronization requests.

5. A system for committing or rolling back a unit of work in a network of computer systems having a plurality of database management system (DBMS) members, the system comprising:

means for assigning a network address and resync identifier to each DBMS member, wherein the network addresses and resync identifiers are stored in a global list;

means for establishing a connection between a client and a specified DBMS member, wherein the client receives the resync identifier of the specified DBMS member;

means for receiving, from the client, an indoubt unit of work at the specified DBMS member;

means for changing the network address of the specified DBMS member after the indoubt unit of work is received; and means for completing a resynchronization process which commits or rolls back the indoubt unit of work using the resync identifier of the specified DBMS member to retrieve the changed network address in the global list for the client, so that the client can reconnect to the specified DBMS member at the changed network address.

6. The system of claim 5 wherein the network address is an IP address in a TCP/IP network.

7. The system of claim 5 wherein the network is NETBIOS.

8. A system for committing or rolling back a unit of work in a network of computer systems having a plurality of database management system (DBMS) members, the system comprising:

means for assigning a network address and resync identifier to each DBMS member, wherein the network addresses and resync identifiers are stored in a global list;

means for establishing a connection between a client and a specified DBMS member, wherein the client receives the resync identifier of the specified DBMS member;

means for receiving, from a client, an indoubt unit of work at a specified DBMS member;

means for changing a network address of the specified DBMS member after the indoubt unit of work is received; and means for completing a resynchronization process which commits or rolls back the indoubt unit of work using the resync identifier of specified DBMS member to retrieve the changed network address in the global list for the client, so that the client can reconnect to the specified DBMS member at the changed network address.

9. The system of claim of claim 8 wherein the resync identifier comprises a separate unique resynchronization port identifier for the specified DBMS member to complete the resynchronization process.

10. A system for processing a plurality of resynchronization requests in a network of computer systems, the system comprising:

means for assigning a network address and resync identifier to each of a plurality of DBMS members, wherein the network addresses and resync identifiers are stored in a global list;

means for establishing a connection between at least one client and the plurality of DBMS members, wherein the client receives the resync identifiers of the DBMS members;

means for receiving, from the client, a separate indoubt unit of work at each of the plurality of DBMS members having separate network addresses;

means for changing at least one location of the plurality of DBMS members such that each DBMS member has a same resync identifier and a changed network address;

means for completing the plurality of resynchronization requests using a same plurality of DBMS members at the same resync identifier and the changed network address, wherein the resync identifiers of the plurality of DBMS members are used to retrieve the changed network address in the global list for the client, so that the client can reconnect to the plurality of DBMS members at the changed network addresses.

11. The system of claim 10 wherein the resync identifiers comprise separate unique resync port identifiers assigned separately to each one of the plurality of DBMS members to complete the plurality of resynchronization requests.

12. A program on a computer usable medium having executable instructions for implementing a method for committing or rolling back a unit of work in a network of computer systems having a plurality of database management system (DBMS) members, comprising;

means for assigning a network address and resync identifier to each DBMS member, wherein the network addresses and resync identifiers are stored in a global list;

means for establishing a connection between a client and a specified DBMS member, wherein the client receives the resync identifier of the specified DBMS member;

means for receiving, from the client, an indoubt unit of work at the specified DBMS member; and means for completing a resynchronization process which commits or rolls back the indoubt unit of work using the resync identifier of the specified DBMS member to retrieve the changed network address that has changed after the indoubt unit of work was received, the changed network addresses being retrieved from in the global list for the client, so that the client can reconnect to the specified DBMS member at the changed network address.

* * * * *